(No Model.)

O. WILSON.
RUNNING GEAR FOR VEHICLES.

No. 554,472. Patented Feb. 11, 1896.

Witnesses:
Alex Scott
D. V. Edelin

Inventor
Odell Wilson

UNITED STATES PATENT OFFICE.

ODELL WILSON, OF ST. LOUIS, MISSOURI.

RUNNING-GEAR FOR VEHICLES.

SPECIFICATION forming part of Letters Patent No. 554,472, dated February 11, 1896.

Application filed September 10, 1895. Serial No. 562,099. (No model.)

*To all whom it may concern:*

Be it known that I, ODELL WILSON, a citizen of the United States, residing at St. Louis, in the State of Missouri, have invented certain new and useful Improvements in Running-Gear for Wheeled Vehicles, of which the following is a specification.

This invention relates to running-gear for wheeled vehicles; and it consists in the combination, with the wheels and axles of a vehicle, of pneumatic or cushion wheels operating in conjunction with the running-gear in such a manner that the vehicle shall have the principal advantages and benefits derived from the use of pneumatic or cushioned tires without being subject to the dangers or liabilities of cushioned tires as they are now used on the rims or fellies of carriage or wagon wheels.

The invention comprises the new constructions and combinations, substantially as hereinafter described and pointed out in the claim.

Figure 3:
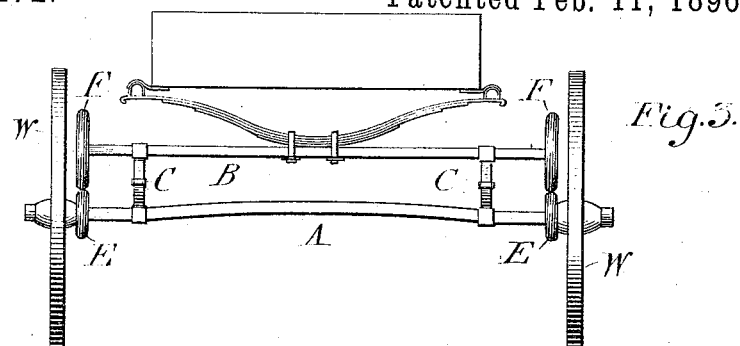
Figure 2:
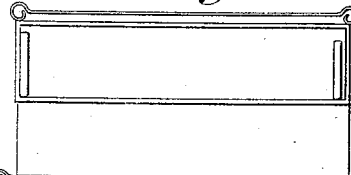
Figure 1:
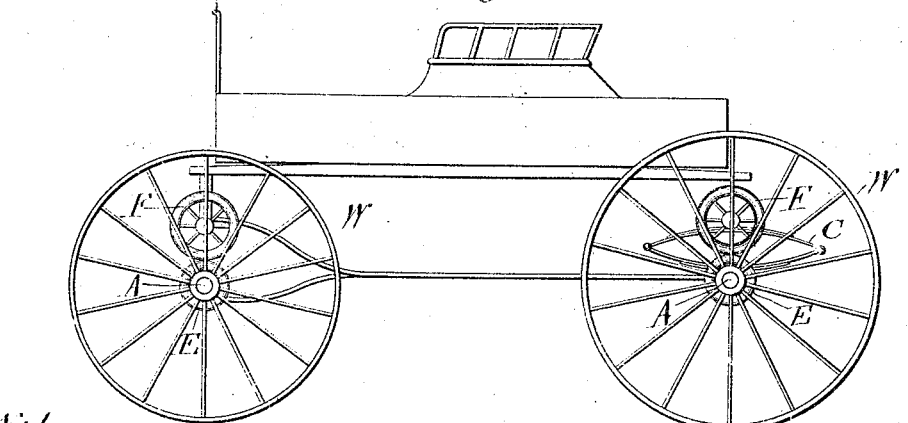

In the accompanying drawings, Figure 1 is a side elevation of the running-gear of a buggy or wagon having my invention embodied therein. Fig. 2 is a front end elevation of the same. Fig. 3 is a rear end elevation of the same. Figs. 4, 5, 6, and 7 are modified forms of construction and adaptation of my invention.

A A represent the axles, and W W the wheels, of the common running-gear of such vehicles.

Figure 4:
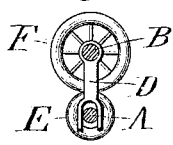

B B are superaxles supported above the axles A A by interposed elliptic or other suitable springs C C, and may also be provided with depending arms D D, having forked ends which straddle the axles A A, as seen in Fig. 4, and serve as guides to aid in maintaining the axles B B perpendicularly over the axles A A.

Figure 5:
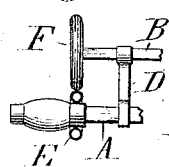

E E are pneumatic or cushion wheels or small tires fixed upon the inner ends of the hubs of the wheels W W, and rotate with them, as seen in Fig. 5.

F F are pneumatic or cushioned wheels having hubs and are mounted on the ends of the axles B B, directly over the wheels or rollers E E, and bearing upon said wheels or rollers are made to rotate by them.

The bolster and fifth-wheel are fixed on the forward upper axle B. The rear axle B may be supported by two elliptic springs C C or any other form of springs or construction.

Figure 6:
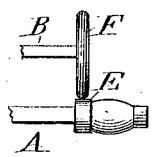
Figure 7:
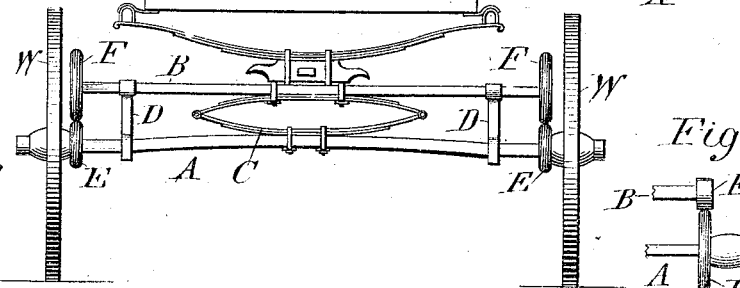
Figure 7:
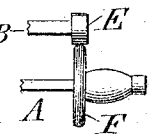

The inner ends of the hubs of the wheels W W might be made with solid bands and the wheels F F ride on their plain peripheries, as seen in Fig. 6, or the pneumatic or cushion wheels might be fixed on the hubs or flanges constructed on the wheels W W, and the wheels or rollers E E on the upper axles be plain, as shown in Fig. 7.

I do not wish to be confined to the exact construction and arrangement shown of the pneumatic or cushion wheels or tires relative to the main wheels of a vehicle, as many modifications are susceptible, my object being to provide all wheel-vehicles with cushioned wheels not running upon the ground and avoid the liability of damage to the tires, yet giving to such vehicles all the ease and comfort of riding upon cushioned tires.

Having described my invention, what I claim, and desire to secure by Letters Patent, is—

The combination with the wheels W W and axles A A of wheeled vehicles, of the superaxles B B, supporting the body of the vehicle and mounted on the front and rear springs C C, the pneumatic or cushion wheels E E, mounted on the ends of the superaxles B B and hubs of the wheels W W, substantially as described and for the purpose set forth.

ODELL WILSON.

Witnesses:
GEO. W. TIBBITTS,
LEWIS W. FORD.